United States Patent [19]

Slavik et al.

[11] Patent Number: 5,090,190

[45] Date of Patent: Feb. 25, 1992

[54] DOUBLE SENSOR DOCKING SYSTEM PARTICULARLY FOR TEXTILE RING SPINNING MACHINES

[75] Inventors: Walter Slavik; Giorgio Citterio, both of Horgen; Guido Brunecker, Oetwil, all of Switzerland

[73] Assignee: Maschinenfabrik Rieter AG, Winterthur, Switzerland

[21] Appl. No.: 588,165

[22] Filed: Sep. 26, 1990

[30] Foreign Application Priority Data

Oct. 3, 1989 [CH] Switzerland .................. 03596/89

[51] Int. Cl.$^5$ ................... D01H 9/02; D01H 15/00
[52] U.S. Cl. ........................ 57/264; 57/262; 57/279
[58] Field of Search ............ 318/568.17, 592, 593; 57/264, 261, 262, 263, 305, 265

[56] References Cited

U.S. PATENT DOCUMENTS

| | | | |
|---|---|---|---|
| 2,907,936 | 10/1959 | Brannan | 318/592 |
| 3,373,551 | 3/1968 | Gillono et al. | 57/262 |
| 3,445,997 | 5/1969 | Prat | 57/262 |
| 3,688,486 | 9/1972 | Bell et al. | 57/262 |
| 3,905,186 | 9/1975 | Harmon et al. | 57/262 |
| 4,025,839 | 5/1977 | Maury | 318/632 |
| 4,225,928 | 9/1980 | Ohkubo | 318/594 X |
| 4,897,586 | 1/1990 | Nakata et al. | 318/568.17 X |

FOREIGN PATENT DOCUMENTS 2757956  6/1979  Fed. Rep. of Germany ........ 57/264

Primary Examiner—Daniel P. Stodola
Assistant Examiner—John F. Rollins
Attorney, Agent, or Firm—Burns, Doane, Swecker & Mathis

[57] ABSTRACT

In order to coordinate the movements of two movable parts on a spinning frame and a service robot, a system is provided in which one part carries two sensors which are used to detect the position of the other part within the respective measuring ranges of the sensors. This system provides for rough positioning of one part to the other at a relatively high speed until the first sensor detects the second part. Thereafter, coordination of the movements of the two parts takes place within narrow tolerance limits using the second sensor which has a narrow measuring range.

6 Claims, 5 Drawing Sheets

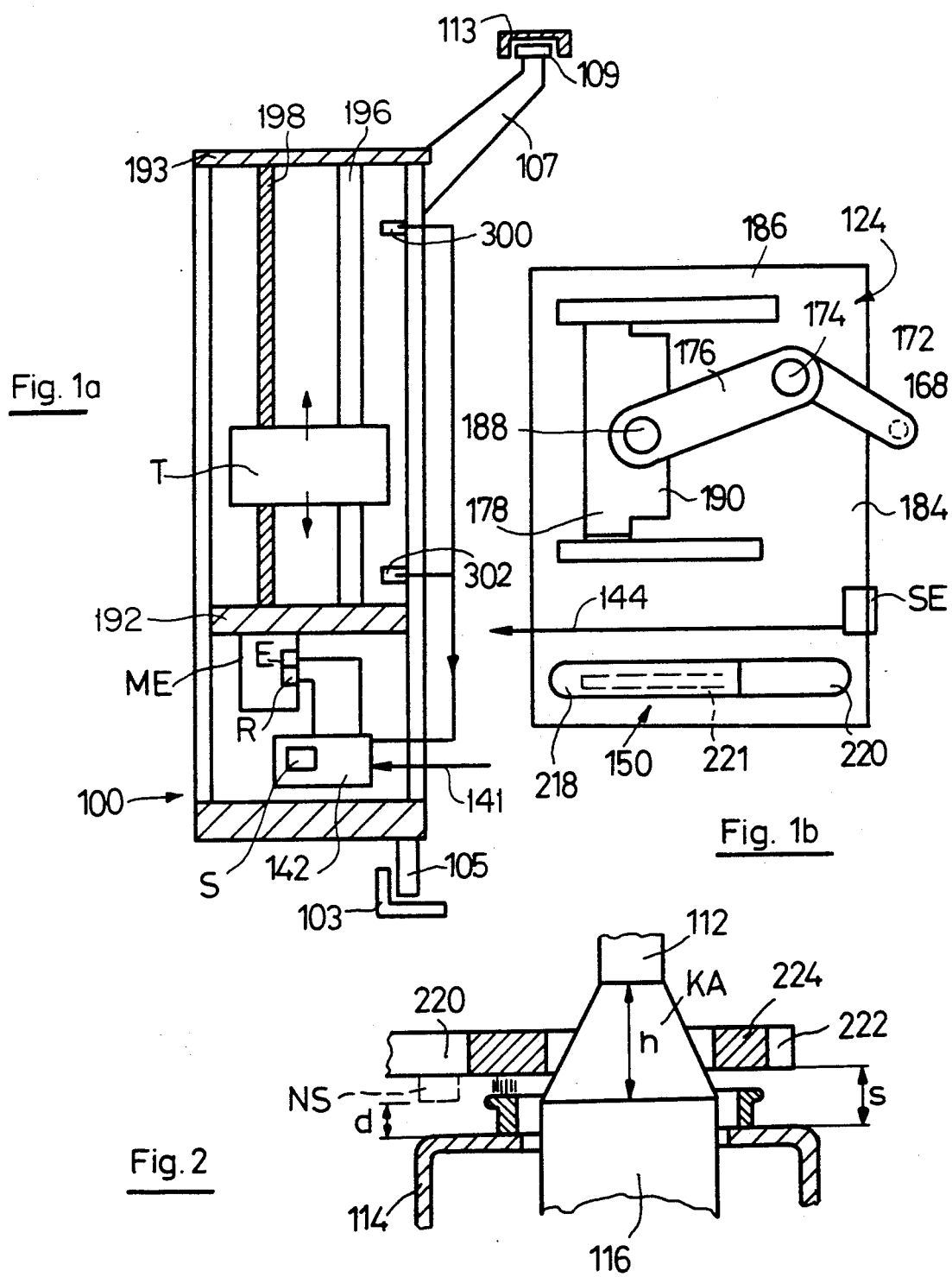

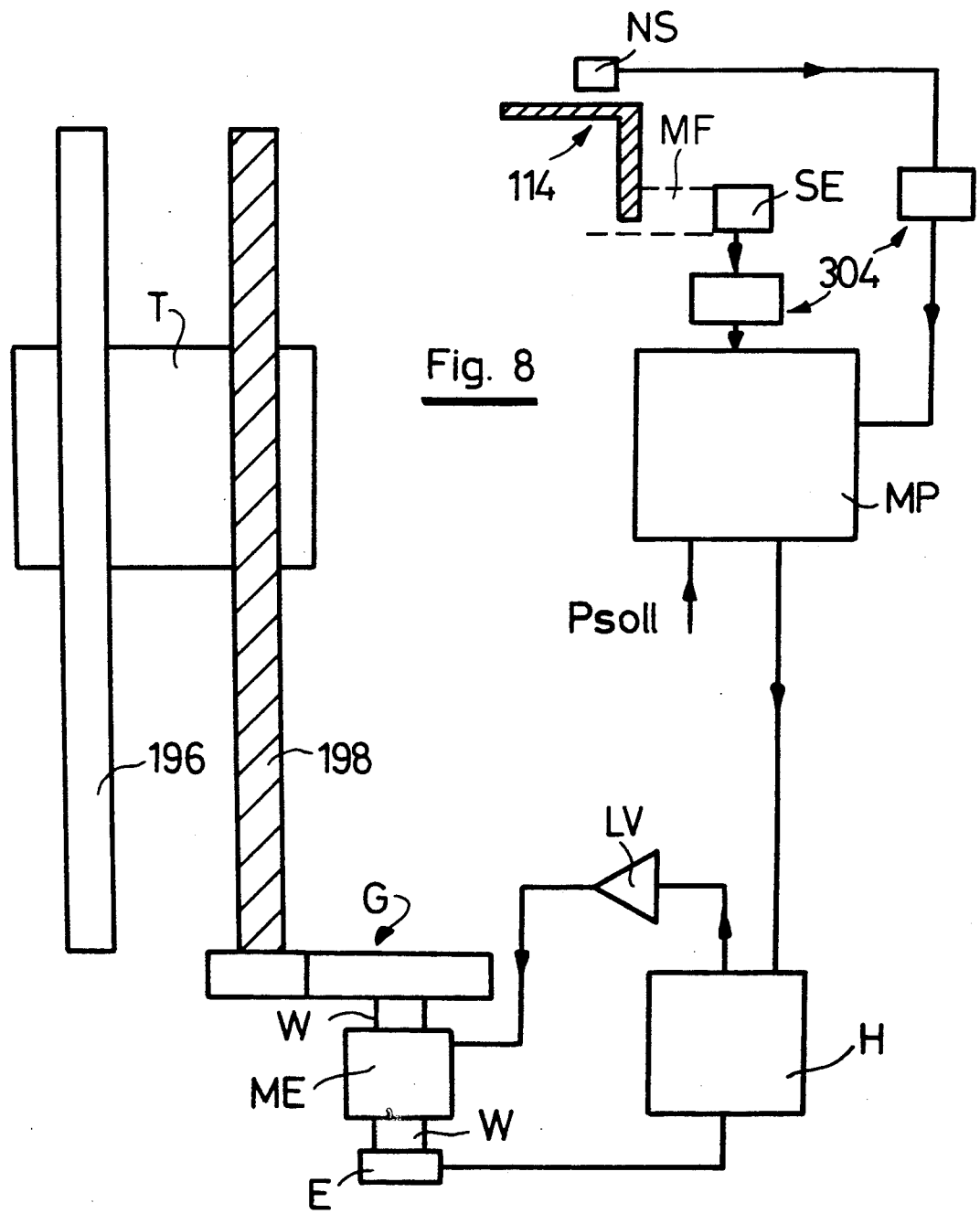

DOUBLE SENSOR DOCKING SYSTEM PARTICULARLY FOR TEXTILE RING SPINNING MACHINES

FIELD OF THE INVENTION

This invention relates particularly to a system by which the movements of a movable part of a service robot can be coordinated with the movement of the ring rail of a ring spinning frame without contact. However, in some aspects the invention is not limited to the combination of a service robot and a textile machine but is concerned more generally with a docking system to coordinate the movements of two movable parts, each of them being connected to their own drive to cause the respective movements.

BACKGROUND

Ring spinning machines ordinarily include many processing lines in which the textile fibers to be spun are drafted and twisted into yarns or the like. These lines are arranged side by side and terminate in vertical cops on which the yarns are wound as they are spun. A reciprocating ring rail in the vicinity of the cops causes the yarns to traverse up and down as they are wound onto the cops to fill out the yarn packages in the desired manner.

Service robots sometimes are associated with such ring spinning machines to carry out various service functions at the several processing lines. Typically, a service robot will be movable along the length of the ring rail to the location of a processing line to be serviced and includes a vertically movable carriage for one or more working heads. After the robot has been positioned at the desired processing line, the vertical position of the carriage is correlated with the vertical position of the work to be done and the working head is extended horizontally as necessary to accomplish the task for which it was designed.

In some instances it is desirable to move the carriage of a service robot into a desired positional relationship with respect to the reciprocating ring rail and hold it there while a working head is carrying out its task at the adjacent processing line.

Systems known to coordinate the movements of different independently driven machine parts, for instance according to DE-AS 25 01 338, are not quite suitable for use in modern spinning frames since they are designed for slower sequences of movement and since they do not achieve the necessary accuracy in the coordination of the said movements.

SUMMARY OF THE INVENTION

According to the invention, in a system where the movements of two separately driveable parts are to be coordinated free of contact, at least one part is provided with two sensors which are arranged to detect the position of the other part within a given measuring range or detecting field. The measuring range of one sensor can be relatively large, so that this sensor is suitable to search for the other part i.e. to roughly position the parts towards each other. The other sensor can have a rather small measuring rang and is therefore suitable for the fine positioning of the two parts within a relatively narrow tolerance.

Furthermore, the invention includes control means for the drive of the first part, which can react to an output signal of the first or the second sensor and means to switch from one sensor to the other when changing from rough positioning to fine positioning.

Embodying the invention in a service robot-ring spinning machine combination involves arranging the two sensors to respond to the relative vertical positioning of the ring rail and a vertically moveable component of the robot. Such component is set into downward motion toward the ring rail at a rapid rate until the first sensor signals that the desired relative spacing is being approached. Then, the relative speed is reduced. When the approximate desired relative spacing has been stabilized the second sensor takes over the control to hold the desired relative spacing as the ring rail continues its reciprocations.

The first sensor can be kept in a fixed position with respect to the first movable part, while the second sensor is supported movably by the first part; i.e., between either an operating position and a withdrawn position. The second sensor can only be moved from its withdrawn position into its operating position, if both parts have been roughly positioned towards each other by the first sensor.

The measuring range of the second sensor can therefore be dimensioned so narrowly that it does not suffice to detect the position of a second part without moving the sensor into its operation position.

According to a preferred embodiment of said invention, the first sensor is an optical type sensor and the second one is an induction type sensor.

While searching the rough position the moving speed of the first part can be reduced to facilitate the positioning process. Before reaching a previously defined positioning deviation, preferably only the speed of the drive for the first part is controlled in accordance with the output signal of the first sensor. Only after reaching that previously defined position deviation is switch over to positioning control initiated.

BRIEF DESCRIPTION OF THE DRAWINGS

In the following, the invention is further explained with reference to the accompanying drawings wherein:

FIG. 1a is a schematic representation of a service robot, and FIG. 16 is a detail of the robot to a larger scale;

FIG. 2 is a schematic cross-section of a part of a spinning unit together with an operating head of the robot of FIGS. 1a, and 1b;

FIG. 8 is a schematic depiction of a control system for the combination according to FIGS. 3-6;

DETAILED DESCRIPTION OF PREFERRED EMBODIMENTS

Figure 3:
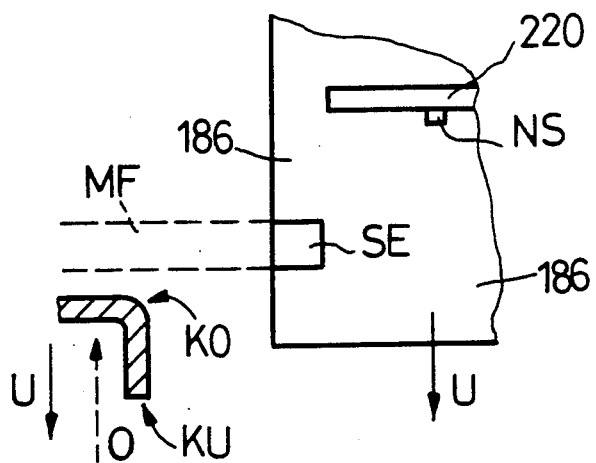
FIGS. 3-6 are schematic views to explain further features of the system shown in FIGS. 1 and 2.

FIG. 1a together with FIG. 1b schematically show a service robot for a ring spinning frame or a ring twister. The traveling frame is marked with reference 100 and runs on drive wheels 105 guided by rail 103 along the machine to be attended to. The traveling frame 100 carries at least one support 107 with a guide roller 109, which runs in a second guide rail 113 and keeps the frame 100 in a previously determined position to the machine which is not shown. The two guide rails are connected with the machine.

The traveling frame 100 carries a guide rod 196 and a threaded spindle 198 both of which are positioned vertically between an upper plate 193 and a lower supporting plate 192. The threaded spindle 198 extends through a bore in the lower supporting plate 192, and is coupled with a motor ME. Turning of the threaded spindle 198 around its own longitudinal axis by the motor ME, effects a vertical shift of support T which is supported by the threaded spindle 198 and guided by bar 196. A carriage 186 (FIG. 1b) is mounted on support T so that the carriage moves upwards and downwards with the support. The carriage 186 itself carries certain elements, which are designed to carry out operating tasks on the spinning unit of the ring spinning frame. In order to better explain carriage 186, it is shown in a larger scale (FIG. 1b) beside the robot in FIG. 1a, where certain control connections between the carriage and the traveling frame are shown schematically.

A service robot of the type depicted in FIGS. 1a and 1b is known from the prior art—see for example DAS 25 01 338 and U.S. Pat. No. 3,445,997, the disclosures of which are incorporated herein by reference. Movability of one part of the service robot in a vertical direction can serve various functions. The respective operating procedure requires a complex combination of functions which, correspondingly, sets high standards for the system requirement of movement for carriage 186 and which therefore are suitable to show the possibilities of a system in the invention. In some of its aspects, however, the invention is not limited to an application in combination with such devices.

Carriage 186 carries an operating device 124 and a reeling device 150

Device 124 comprises a pivotable case 190 which is rotatably mounted around a vertical axis 178. Axis 178 runs vertically between an upper and a lower plate, which both are mounted rigidly on a support 184. Case 190 bears two levers 172, 176 which are connected with each other by swiveling axis 188. At its free end, lever 172 has a holding device 168 for a yarn guide element which is not shown, for example the outlet part of a yarn storage unit in the form of a suction pipe. Axes 174, 188, 178 are driven and are controlled by a control device 142 (FIGS. 1a and 1b) in the traveling frame 100 in order to manipulate a yarn in reference to carriage 186. When the service robot is moved along the machine, arms 172 and 176 of the operating device 124 in the service robot are retracted to prevent collisions with parts of the machine. Once the service robot has positioned itself at a spinning unit, lever 172 with its holding device 168 can reach into the spinning unit to carry out certain operations.

A reeling device 150 includes a support cylinder 218, which is fixedly mounted on the carriage plate 184 and an operating head 220, which is mounted on a rod 221 which runs within cylinder 218. During movement of the robot (FIG. 1b), operating head 220 is kept in a retracted position, with respect to the carriage plate 184. However, by moving rod 221 towards the right, in FIG. 1a, it can be extended outwardly of the carriage plate 184, to the right in FIG. 1b, and into a spinning unit to carry out work.

FIG. 2 shows a partial view of a spinning unit, that is a cross-section of ring rail 114 with the spinning ring 114' with a partially shown cop 116 on a tube 112. The shown part of cop 116 includes the conical section KA with the uppermost winding corresponding with the uppermost turning point of the lifter motion of ring rail 114. The axial length h of the conical section corresponds with the vertical lift of the ring rail movement, where this lifter motion is shifted upwards step by step during formation of the yarn package, in order to build-up the cops layer by layer.

In a pre-determined operation position of operating head 220 this element is moved closely to the spinning unit from the robot in order to bring a part 222 of the operating head to the cop thereby forming a running path for traveler 224. Carriage 186 moves upwards and downwards along spindle 198 corresponding with the lifter motion of ring rail 114. During this process a predetermined space S between the operating head 220 and ring rail 114 has to be maintained.

To set and keep the corresponding desirable position of carriage 186 and ring rail 114, two sensors can be mounted on the carriage, i.e. an optical sensor SE (FIG. 1b) on carriage 186 itself, having an output 141, and an induction proximity sensor or switch NS (FIG. 2) on operating head 220. Both sensors can then be connected with control device 142 (FIG. 1a) for the motor ME.

The following description mainly deals with the nature of the sensors SE and NS, comparing them with one another, describing their interaction and describing their interaction with control system 142.

FIGS. 3 to 6 each show part of carriage 186 with sensor SE, part of operating head 220 with sensor NS and part of ring rail 114 facing towards carriage 186.

First it is assumed that the service robot is not very close to ring rail 114 and therefore has to go through a search process. For such a process carriage 186 is moved upwards along spindle 198 and bar 196 until the carriage has reached a position which is above the uppermost turning point of the ring rail. The direction of the movement of carriage 186 is then changed in such a way that it moves downwards in the direction of the arrow U (FIG. 3). This movement downwards is carried out at a relatively high searching speed, which is governed by control device 142. Operating head 220 is in a retracted position on carriage 186 while sensor SE covers a measuring range that extends into the spinning unit in a crosswise direction of the movement of carriage 186.

In the period of motion shown in FIG. 3, carriage 186 is still so far above ring rail 114 that the latter has not entered the measuring range of sensor SE yet. At this stage the ring rail can move downwards (direction of arrow U) or upwards (direction of arrow O, dotted) depending on the cop formation program of the spinning frame. The search speed of carriage 186 is therefore considerably higher than the downwards after motion of ring rail 114.

Figure 4:
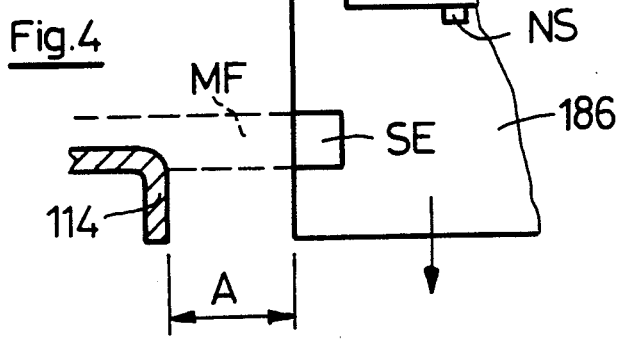

FIG. 4 shows entrance of the upper edge of ring rail 114 into the measuring range MF of sensor SE. This can either happen because carriage 186 and ring rail 114 cross each other or because carriage 186 has caught up with the ring rail during its downwards lifter motion. Sensor SE registers the entrance of the ring rail into its measuring range and changes its output signal accordingly. Control device 142 (FIG. 1a) responds to this by reducing the speed of carriage 186 from search speed to positioning speed. The carriage still moves downwards at a speed which is slightly higher than the speed of ring r il 114 if the latter also moves downwards. At approximately the same time, control device 142 initiates a movement of the operating head from its retracted position into its operating (forwards) position.

Figure 5:
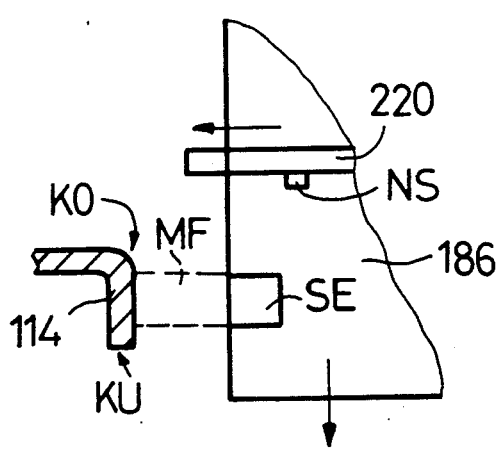

This condition of the system is maintained until carriage 186 and ring rail 114 which are shown in FIG. 5 have reached a position opposite each other whereby the front end of ring rail 114 facing towards carriage 186 is directly positioned opposite sensor SE. This condition is reached relatively fast if ring rail 114 moves upwards and relatively slowly if the carriage 186 has to overtake ring rail 114 during its downward movement. The signal output through sensor SE has reached a maximum value if sensor SE with its measuring range MF has approximately reached half the height of the vertical rim of ring rail 114, as shown in FIG. 5. The movement of the operating head 220 in the direction of its fully extended (operating) position (FIG. 6) is continued. FIG. 5 shows an intermediate stage where sensor NS is not yet above ring rail 114 and thus does not yet provide any control function.

Figure 6:
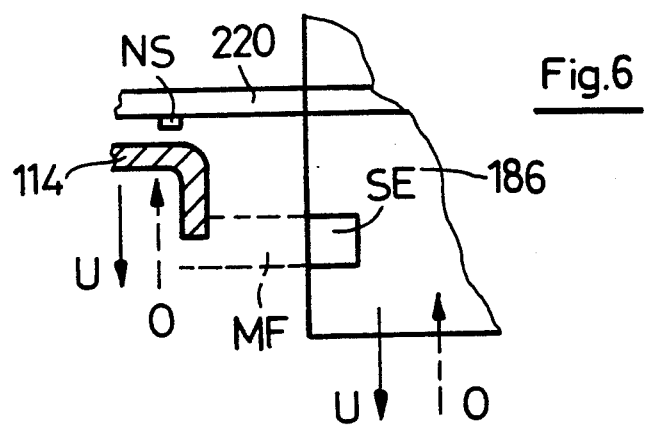

In FIG. 6 where operating head 220 is shown in its operating position, sensor NS is situated directly above ring rail 114. The control system however only switches then from the output signal of sensor SE to the output signal of sensor NS if carriage 186 has reached a pre-determined position opposite ring rail 114 which corresponds with an identifiable position of the lower edge KU of ring rail 114 in the measuring range MF of sensor SE.

Afterwards the control function is not carried out any more in dependence on the output signal of sensor SE but in dependence on sensor NE. Before this switch over from one sensor to the other, the configuration of the control function itself is changed, this being done in such a way, that the motor ME (FIG. 1a) is not only subjected to a speed control but after this switch over also to a position control. This switch over is further explained in FIG. 9. However, first the procedure will be explained by way of the diagrams in FIGS. 7a and 7b once more and then the relations of the features of the two sensors SE and NS will be explained.

Figure 7A:
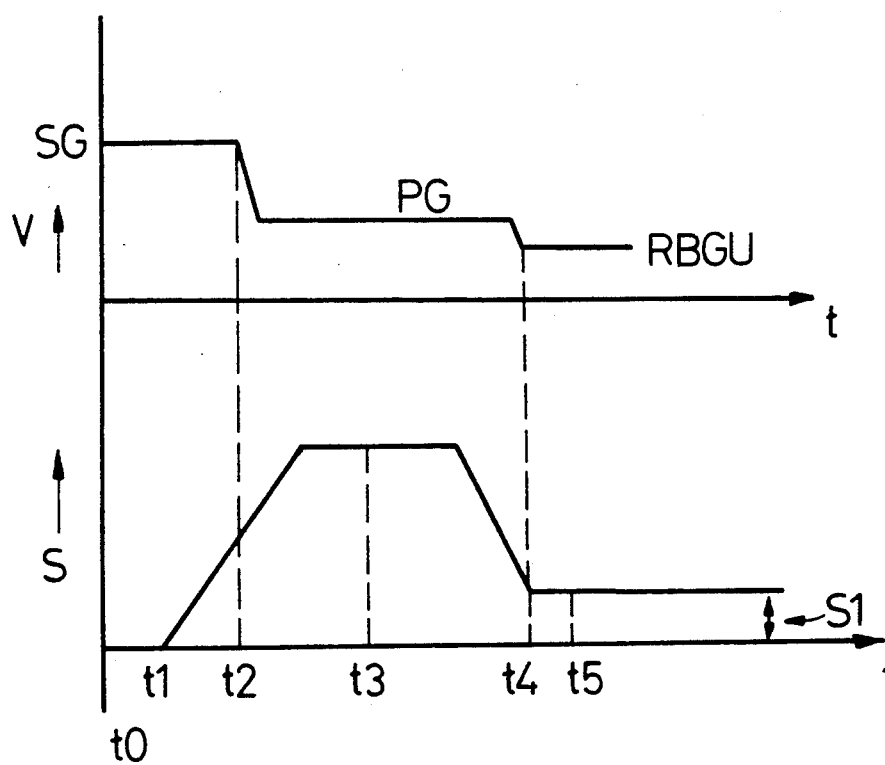
FIGS. 7a-7b show time curves to explain the steps of the operational process.

FIG. 7a shows time on the horizontal axis, while the vertical axis in the upper part of the diagram shows the speed V of carriage 186, and in the lower part of the diagram, the voltage S at the output of sensor SE is indicated. In the following exemplary discussion, it will be assumed that ring rail 114 moves downwards. At the point of time t0 the system is in a condition that corresponds with the one shown in FIG. 3 where the carriage moves downwards at searching speed SG and the voltage at the output of sensor SE is assumed to be 0. At the point of time t1, the upper edge KO of ring rail 114 enters the measuring range of sensor SE and the voltage at the output of this sensor increases. After a slight delay this leads, at the point of time t2, to a reduction of the carriage speed to the positioning speed PG. At approximately the same time, operating head 220 starts to move towards its operating position which it has to reach before the point of time t4.

Point of time t3 corresponds with the condition in FIG. 5 with the output voltage of sensor SE at its maximum. At the point of time t4 the function of the control system is altered in order to regulate motor ME thereafter in dependence on the relative position of carriage 186 with respect to ring rail 114. Therefore, after this point of time t4, the speed of carriage 186 is changed once more to adjust it to the lowering speed RBG of ring rail 114. At this point of time sensor NS is exactly above ring rail 114, but the first stage of the positioning control continues in response to the output signal of sensor SE until, up to the point of time t5, the deviation of the positioning control remains stable below a predetermined limit corresponding, for example, to the measuring range of the sensor NS. The measuring range of the sensor NS is, for example, 3 mm. Then switch over to a control function through the output signal of sensor NS takes place, which assures maintenance of the respective clearance between the parts. Therefore, voltage S1 at the output of sensor SE remains constant after point of time t5 until the operation is terminated.

Figure 7B:
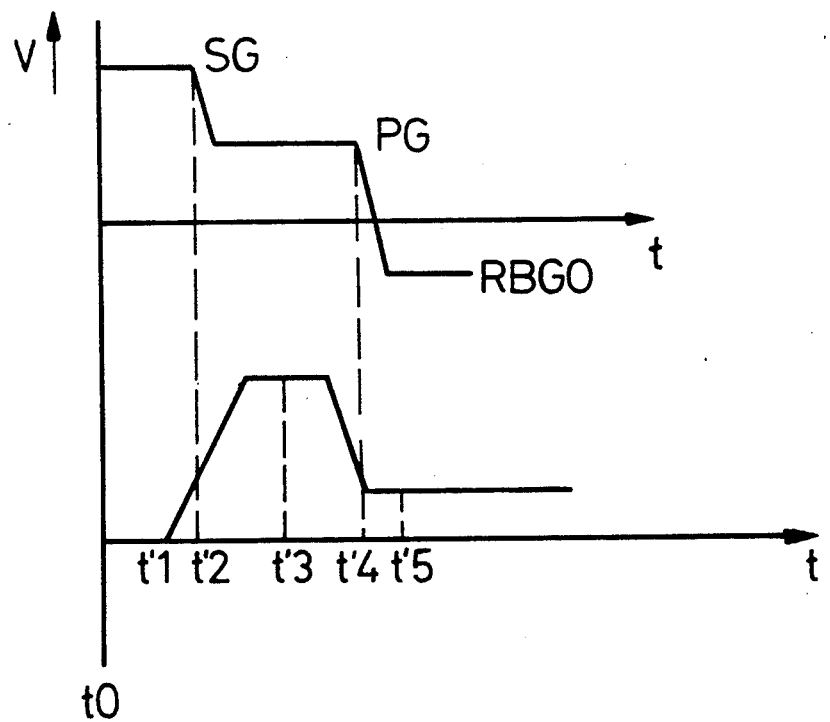

FIG. 7b shows the same process but for the case where ring rail 114 moves upwards in the direction of arrow 0 (FIGS. 3-6). For this reason the process has to be faster which shortens the time intervals between the various points of change over. This is indicated in FIG. 7b with an apostrophe on reference marks t2, t3, t4 and t5. The other important difference between FIG. 7a and FIG. 7b can be seen in the upper part of the diagram where carriage 186 has to return between the point of time t4 and t5 in order to follow ring rail 114 with the lifter speed RBGO.

A main difference between sensors SE and NS is in the size of their measuring range. While sensor SE has a relatively large measuring range, i.e. a measuring range with a large spread and a long reach, in order to scan the position of ring rail 114 from the carriage 186, the sensor NS has a relatively small measuring range with less reach and spread. Sensor NS can therefore only be used for control functions when its support head 220 is extended out towards its operating position and when ring rail 114 and carriage 186 have been brought within a fine positioning range by the output signal of sensor SE. The output signal of sensor NS however reacts to rather small deviations of the desired distance S (FIG. 2) which easily allows maintenance of this distance.

FIG. 8 shows further details of the control system to attain the results already described. It is assumed that shaft W of motor ME is connected with the spindle 198 by means of gears G and that this shaft is also provided with an encoder E. The output signal of encoder E is sent to a control processor H which releases signals to control power amplifier LV. Amplifier LV controls the power given to the motor ME. Control processor H is controlled by a main processor MP.

The control circuit represented by elements E, H, LV, ME is able to control the speed of the motor ME with commands produced by the main processor MP. In this case all information about positioning is processed in the main processor itself.

FIG. 8 once more schematically shows ring rail 114 with sensor SE and its measuring range MF at the approximate point of time when the switch over from sensor SE to sensor NS should be carried out. Sensor NS is therefore directly above ring rail 114. Both sensors SE and NS are connected with the main processor MP through their respective analog/digital converter 304. At the input P soll (=P target) to the main processor MP, the user can input the desired position of sensor SE in relation to ring rail 114 where the switch over from sensor SE to sensor NS should take place.

Figure 9A:
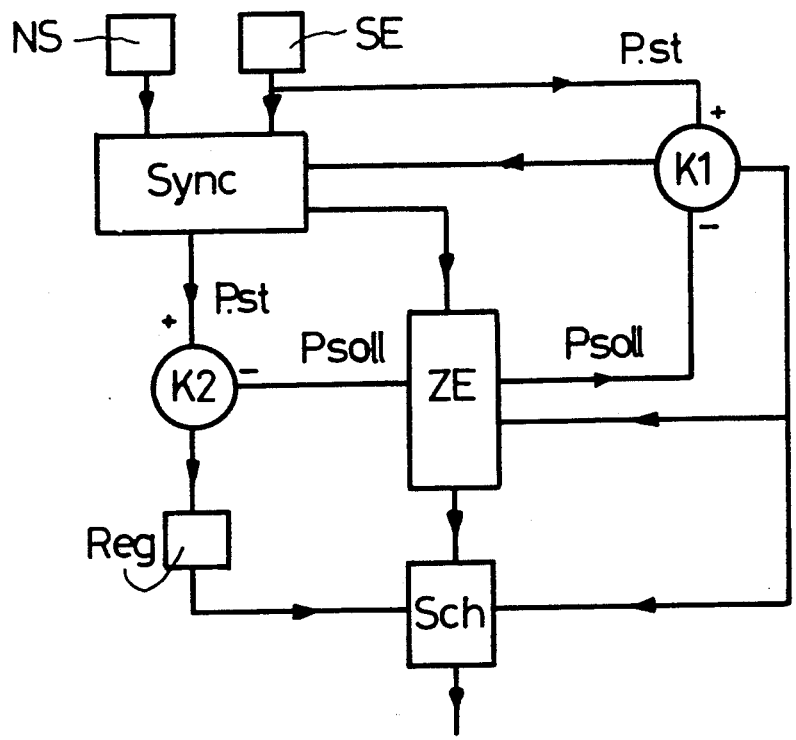
FIG. 9a is a detail of the system according to FIG. 8, and FIGS. 9b, 9c and 9d show different operating steps of the device.

FIG. 9a shows the course of certain functions within main processor MP. It should be understood that these functions may actually be carried out through programming of the processor and not by hardware connections. The schematical representation however, facilitates explanation of this function. The schematic FIGS.

9b, 9c and 9d show, in a simplified form, various stages of the positioning process. According to the display in FIG. 9a, main processor MP consists of the central unit ZE which has control and monitoring functions, synchronizing unit Sync, which carries out the switch over from sensor SE to sensor NS, two comparators K1 and K2, a control device Reg and a switch device Sch.

Figure 9B:
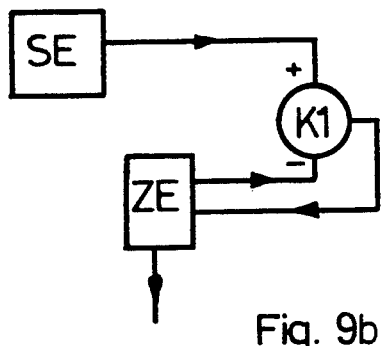

The first stage of this situation is shown in FIG. 9b which corresponds with the periods of time t0 to t4 in FIGS. 7a and 7b. At that time only sensor SE is effective and relates its output signal P ist (=P actual) to comparator K1 which also receives a target value P soll (=P target). When the output signal P ist (=P actual) remains on 0 according to FIGS. 7a and 7b, the relative positioning of the parts has not yet reached the limits of the rough positioning range. The speed commands from the main processor to control processor H (FIG. 8), are determined directly by the central unit. The condition of switching device Sch (FIG. 9a) is set accordingly by comparator K1. Entering of the upper rim of ring rail 114 into measuring range MF is registered by comparator K1 and related to the central unit ZE (FIG. 9b) so that the speed set by the central unit is reduced.

Figure 9C:
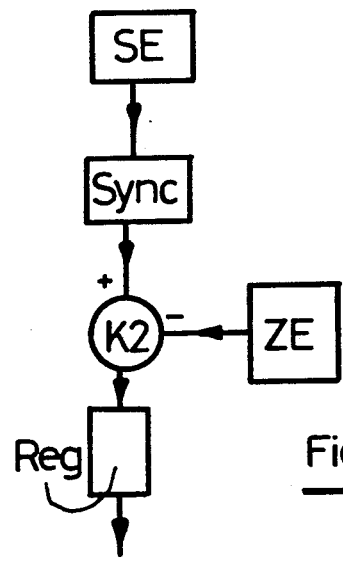

At the point of time t4 the process changes to the situation shown in FIG. 9c in such a way that comparator K1 recognizes the desired respective position of the parts by comparing the values of P ist (=P actual) and P soll (=P target). Comparator K1 changes the condition of switching device Sch accordingly so that the signals given to control processor H are not determined directly by the central unit ZE anymore but by control device Reg. The input signal to the control device Reg corresponds to a deviation provided by comparator K2 between the output signal P actual of sensor SE and the target value P target set by the central unit ZE, and the control device Reg operates, for example, to integrate several consecutive values of the deviation.

Figure 9D:
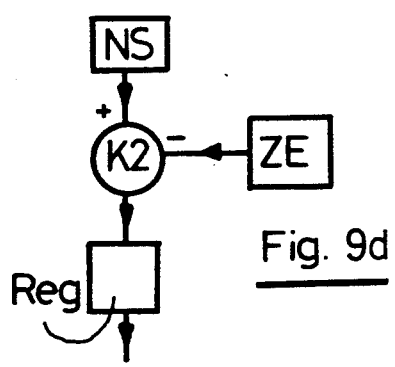

During the change over to the situation in FIG. 9c, comparator K1 also relates a signal to the synchronizing device Sync which, from then on checks whether the deviation of the position is below a pre-determined value. As soon as there is indication that the positions fall below this value (point of time t5, FIG. 7a) the device Sync switches to sensor NS. Consequently the situation as shown in FIG. 9d remains unchanged until the service operation requiring accuracy in positioning is terminated.

If, within a certain period of time after switching to the situation in FIG. 9c, a switch over to sensor NS cannot be carried out because the control deviation is too large, the procedure has to be stopped and started again from the beginning. The synchronizing unit Sync detects that the change over from one sensor to the other did not take place within the given period of time and relates this to the central unit ZE whereby the latter initiates the interruption of the procedure.

Sensor SE is preferably an optical detector. Sensor NS is preferably an induction sensor which provides at its output an analog signal proportional to the distance between the head of the sensor and the part to be detected.

The combination of two measuring devices as described above, results in a relatively large measuring range by the first sensor and a high measuring accuracy in the main operational area of the service robot defined by the second sensor. The large measuring range of the first sensor SE allows coordination of the separately driven parts at relatively high speed. With a known ring rail, this results in smaller values of torque on the positioning drive through synchronization of the speed of carriage 186 to the speed of ring rail 114. Furthermore it is possible for the devices to monitor one another because two measuring devices are used; this reduces the possibility of malfunctioning which could result in damages. Additionally, it is possible to keep the sensitivity to fluctuations of distance A (FIG. 4) between the measuring device and the ring rail within reasonable limits.

In some of its aspects, the invention is not limited to details of the system described. As an example, it was said that during its search procedure, the carriage moves from an upper position downwards, for a starting position which is above the ring rail. If, by any chance, the ring rail is already within the visual range of sensor SE at the beginning of a positioning process, the first stage of the searching process (FIG. 3) can be omitted so that the desired respective position of the parts can for instance be searched immediately at reduced speed. In principal the system could also be operated from the opposite direction, so that the ring rail is searched from below.

Although the present invention has been fully described by way of example with reference to the accompanying drawings, it should be noted that various changes and modifications will be apparent to those skilled in the art. Therefore, unless such changes and modifications depart from the scope of the present invention, they should be construed as being included within the scope of the appended claims.

What is claimed is:

1. The combination of a service robot with a spinning machine comprising:
   a spinning machine with a vertically reciprocating ring rail in the vicinity of a plurality of cops being wound with yarn;
   a robot being movable lengthwise of said ring rail to positions opposite said cops and having working elements for carrying out tasks on the spinning machine, said robot further including:
   a vertically reciprocable carriage and a variable speed, reversible drive for said carriage;
   a first sensor having a first measuring range for sensing the vertical position of said carriage relative to said ring rail and for supplying a first signal representative of said vertical position,
   a second sensor having a second measuring range narrower than said first measuring range for sensing the vertical position of said carriage relative to said ring rail and for supplying a second signal representative of said vertical position;
   a control means operatively connected to said first sensor, said second sensor and said drive, said control means being responsive to the first signal supplied by said first sensor for controlling said drive to move said carriage vertically towards said ring rail until said second sensor is within said second measuring range, and said control means being further responsive to the second signal supplied by said second sensor when said second sensor is within said second measuring range for controlling said drive to maintain said carriage at a predetermined position vertically with respect to said ring rail.

2. The combination of claim 1, wherein said working elements include a horizontally movable head on said carriage, said control means being operatively connected to said head to cause shifting of the head between a retracted position out of vertical alignment with said ring rail and a working position wherein it overlies said ring rail, said second sensor being mounted to said head for placement into a position to sense the presence of said ring rail when the vertical distance between said sensor and said rail is within said second measuring range.

3. The combination of claim 2, wherein said control means causes said drive to move said carriage downwardly at a first predetermined speed when said head is being lowered initially from a starting position in which said ring rail is not within said first measuring range and then at a second predetermined speed when said ring rail is within said first measuring range and wherein said control means causes said drive to move said carriage upwardly or downwardly after said ring rail is within said second measuring range.

4. The combination of claim 3, wherein said control means causes shifting of said head from its retracted position to its working position before said second sensor is within said second measuring range.

5. The combination of claim 1, wherein the output signal produced by said second sensor in response to a given amount of change in the relative vertical positions of said carriage and said rail is greater than the output signal produced by said first sensor in response to the same amount of change in the relative vertical positions of said carriage and said rail.

6. The combination of claim 1, wherein said first sensor is an optical sensor which supplies a first analog signal equal to zero when the relative vertical position of the carriage with respect tot he ring rail lies outside said first measuring range, said first analog signal increasing to a maximum when said relative vertical position lies approximately in the middle of said first measuring range, and said second sensor is an induction sensor which supplies a second analog signal equal to zero when the relative vertical position of the carriage with respect to the ring rail lies above said second measuring range, said second analog signal increasing steadily with relative movement between said ring rail and said carriage throughout said second measuring range.

* * * * *